US006927334B2

(12) United States Patent
Lambiaso

(10) Patent No.: US 6,927,334 B2
(45) Date of Patent: Aug. 9, 2005

(54) CABLE ACCESS BOX FOR COMMERCIAL AIRCRAFT

(75) Inventor: Guy A. Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 256 days.

(21) Appl. No.: 10/348,184

(22) Filed: Jan. 21, 2003

(65) Prior Publication Data

US 2004/0031884 A1 Feb. 19, 2004

Related U.S. Application Data

(60) Provisional application No. 60/397,425, filed on Jul. 19, 2002.

(51) Int. Cl.[7] .................................................. H01J 5/00
(52) U.S. Cl. ............................. 174/50; 174/58; 174/60; 174/66; 248/906; 220/4.02
(58) Field of Search ............................... 174/50, 48, 58, 174/60, 63, 17 R, 66, 67, 135, 65 R; 220/3.6, 3.8, 4.02, 241, 242; 248/906; 439/535

(56) References Cited

U.S. PATENT DOCUMENTS

| 3,864,511 A | * | 2/1975 | Morby et al. .................. 174/58 |
| 4,449,015 A | * | 5/1984 | Hotchkiss et al. ........ 174/138 F |
| 5,117,996 A | * | 6/1992 | McShane ..................... 220/3.7 |
| 6,527,227 B1 | | 3/2003 | Lambiaso |
| 2003/0037950 A1 | | 2/2003 | Lambiaso |
| 2003/0042036 A1 | | 3/2003 | Lambiaso |
| 2003/0042360 A1 | | 3/2003 | Lambiaso |

* cited by examiner

*Primary Examiner*—Dhiru R. Patel
(74) *Attorney, Agent, or Firm*—Harness Dickey & Pierce P.L.C.

(57) ABSTRACT

Access boxes installed within the main cabin of a commercial aircraft provide easier deployment of cables therein. The access boxes include smaller generally rectangular bodies having two openings providing passage of cables from under the main floor into the main passenger cabin to allow access to onboard services by passengers therein. The access boxes may be mounted using permanent fasteners or a removable type connection member. The access boxes are mounted as close to a seat floor track for use in deploying cables therethrough in the conduit of the seat floor track.

17 Claims, 6 Drawing Sheets

CABLE ACCESS BOX FOR COMMERCIAL AIRCRAFT

CROSS-REFERENCE TO RELATED APPLICATIONS

This application claims the benefit of U.S. Provisional Application No. 60/397,425 filed Jul. 19, 2002, the entire disclosure of which is incorporated herein by reference.

FIELD OF THE INVENTION

The present invention relates generally to commercial aircraft, and more particularly to a cable access box for use in accessing cables to deploy throughout the main cabin of a passenger aircraft.

BACKGROUND OF THE INVENTION

In commercial aircraft, connection to onboard systems and components may be necessary, and in particular, cables may need to be deployed to passenger seats to allow access to the onboard systems by passengers within the aircraft. For example, connection to onboard entertainment systems for use by passengers to listen to preprogrammed music or to provide audio to accompany onboard movies may be provided. Further, use of telephones onboard the aircraft, which are installed in seatbacks for use by passengers, may also require connection to systems onboard the aircraft.

It is also becoming more common for passengers to use portable electronic devices while onboard the aircraft, including, for example, personal digital assistants (PDAs) and laptop computers. For example, a passenger may access real time information or the Internet using onboard services, such as, for example, the Connexion By Boeings$^{SM}$ communication service, which provides transmission of data via wired and/or wireless means onboard an aircraft using a satellite communication network.

In order to communicate information throughout an aircraft cabin to thereby provide services onboard the aircraft, appropriate cables and wiring must be provided throughout the aircraft and typically to passenger seats to allow passengers to access the information. In particular, cables and wiring are deployed throughout the main passenger cabin underneath the main aircraft floor panel and through access points within the aircraft. Further, cables provided above the aircraft floor panel (i.e., main cabin floor) are deployed to seats, usually through the conduit of seat track mounting provided throughout the cabin used to mount seats thereon.

Specifically, access points for use in connection with main cables (i.e., loop cables) are provided in the main cabin for accessing these cables to deploy secondary cables therefrom throughout the main cabin (i.e., through the seat track) to seats within the main cabin. Typically, a large access box is provided for use in accessing cables for deployment throughout a large portion of the main cabin. However, a large access box often results in confusion in wiring, such as large number of cables emanating from a single box, and also makes it difficult to troubleshoot when there is a wiring or cable problem in the aircraft. Further, because a larger section of the aircraft must be modified to install these large access boxes, additional inspection certification may be required for such modification. Additionally, depending upon the location of the access box within the aircraft, the tooling necessary for providing such a large access hole may not be available.

Thus, there exists a need for an improved access box and method of deploying cables throughout the main cabin of a passenger aircraft that requires less severe modification to the structure of the aircraft (i.e., no recertification necessary) and simplifies deployment of cables throughout the cabin.

SUMMARY OF THE INVENTION

The present invention provides an improved access box and method of providing access to and deploying cables for use in a commercial aircraft that requires less severe structural modification for installation and simplifies deployment of cables throughout the main passenger cabin of the aircraft. Further, the method of installing an access box of the present invention is simpler, less time consuming and provided at less cost.

Generally, the present invention provides a plurality of smaller access boxes, typically less than about 5 inches (127 mm) by about 7 inches (178 mm) at specific predetermined locations within the main cabin of a commercial aircraft for use in accessing cables for deployment to groups of seats within a particular area of the cabin. The invention allows for ease in deploying cables to each of these groups of seats and facilitates connection of the cables to the seats, as well as troubleshooting in the event of a problem or failure.

Specifically, in one embodiment the present invention provides in combination with a commercial aircraft having cables deployed within a main cabin of the commercial aircraft, an improved access box. The improved access box includes a generally rectangular body having a first opening for accessing cables within the rectangular body from the main cabin and a second opening providing for passage of cables from below a floor panel of the main cabin. The generally rectangular body preferably has a width of less than about five inches (127 mm) and a length of less than about seven inches (178 mm). Connection means are provided for connecting the rectangular body to the floor panel of the main cabin and a cover is adapted for connection to the first opening of the access box to conceal the cables within the generally rectangular body.

The generally rectangular body is preferably connected to the floor panel adjacent to a floor seat track for use in deploying cables throughout the main cabin using a channel of the floor seat track. The cover includes a raised portion allowing for passage of cables from within the generally rectangular body to the channel of the floor seat track.

A plurality of access boxes may be provided within the main cabin and may be connected under passenger seats at predetermined locations. The connection means may include a spring clip providing removable connection of the generally rectangular body from above the floor panel. A plurality of cutouts adapted to be removed to allow for passage of cables into the access box may also be provided. The cutouts may be configured based upon a specific cable termination configuration.

In another embodiment, the present invention provides a commercial aircraft having a main cabin with cables deployed therethrough. The commercial aircraft includes a plurality of seats in the main cabin for use by passengers, electronic components for use by passengers to access on-board systems, with the electronic components connected to the on-board systems via cables, and a generally rectangular access box in each of a predetermined different section of the commercial aircraft for use in connection with a group of seats. The access box has an opening for accessing cables therein from the main cabin and providing for passage of cables from below a floor panel of the main cabin. The generally rectangular body preferably has a width of less than about five inches and a length of less than about seven inches. Connection means are provided for connecting the generally rectangular access box to the floor panel of the main cabin. A cover also may be provided that is adapted for connection to the opening of the generally rectangular access box to conceal the cables therein.

The commercial aircraft may further include a plurality of seat tracks for mounting seats within the main cabin and wherein the generally rectangular access box is connected to the floor panel adjacent the seat track. Further, the plurality of seat tracks for mounting the seats include a conduit providing passage of the cables to the plurality of seats, and the generally rectangular access box is adapted to allow passage of cables into the conduit. The cover is adapted for connection to the generally rectangular access box to conceal the cables therein and may include a raised portion allowing passage of the cables into the conduit. The connection means may include a spring clip allowing for removable connection of the generally rectangular access box from above the floor panel. The generally rectangular access box is preferably connected under the plurality of seats.

In yet another embodiment of the present invention, an improved access box for use with a commercial aircraft and for providing access to cables below a floor panel of a main cabin of the commercial aircraft is configured for connection from above the floor panel of the main cabin. The improved access box may be configured for removable connection to the floor panel, and include at least one resilient connection member providing the removable connection.

A method of the present invention provides access to cables within a main cabin of a commercial aircraft. The method includes providing an access box at a floor panel of the main cabin with the access box having a generally rectangular body having a first opening for accessing cables within the rectangular body from the main cabin and a second opening providing for passage of cables from below a floor panel of the main cabin. The generally rectangular body preferably has a width of less than about five inches and a length of less than about seven inches. The method further includes connecting cables from the first opening to seats within the main cabin to provide access by passengers to on-board systems. The method further provides for connecting the access box from above the floor panel using a spring clip, and connecting cables through seat tracks within the main cabin. A cover may be removably attached to the first opening to conceal the cables therein. Further, the method provides for mounting the access box under the seats within the main cabin.

Thus, the present invention provides an improved access box and method of deploying cables within the main cabin of a commercial aircraft. Using access boxes installed in specific locations within the aircraft cabin, deployment of cables to seats to allow communication with systems on-board the aircraft is simplified.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is generally directed to an access box having a specific configuration and installed in a specific location within a commercial aircraft, it is not so limited, and it is contemplated that the present invention may be configured differently and installed in various locations within a commercial aircraft as desired or needed.

The present invention generally provides a plurality of smaller access boxes installed within the main passenger cabin of a commercial aircraft. The access boxes are positioned in the main cabin such that access for use in deploying cable throughout the cabin is facilitated.

Figure 1:
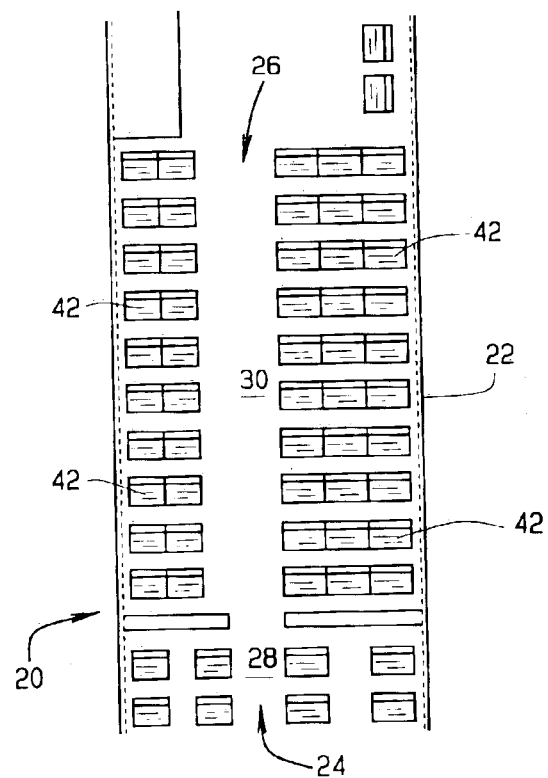
FIG. 1 is a plan view of a partial section of a main cabin of a commercial aircraft.

As shown in FIG. 1, a typical commercial aircraft 20 (e.g., Boeing® 717® or MD-80®) includes a fuselage 22 having a main passenger cabin 24 therein. Depending upon the specific configuration of the aircraft, rows of seats 42 are provided and may be separated by an aisle 26. Further, seating sections may be separated such that a first class section 28 and an economy class section 30 are provided separately within the main cabin 24.

Figure 2:
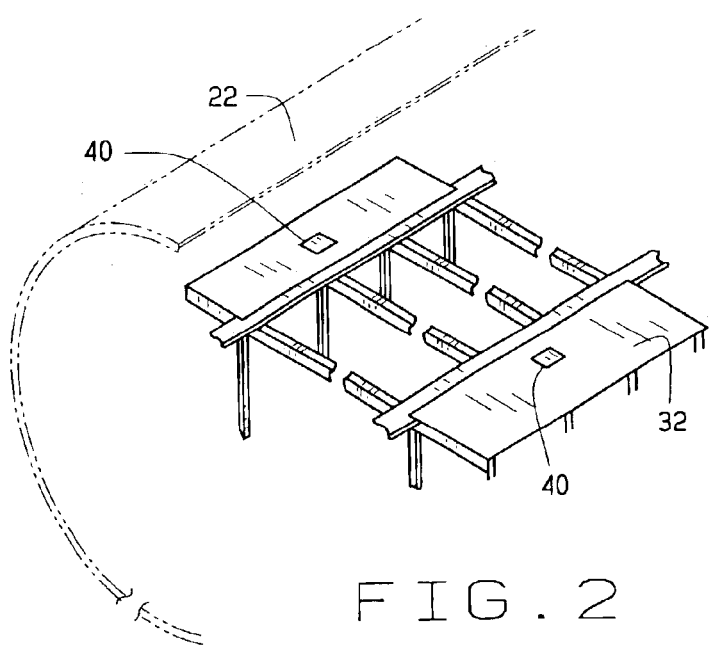
FIG. 2 is a partial cross-sectional view of the fuselage of a main passenger cabin of a commercial aircraft having improved access boxes constructed according to the principles of the present invention therein.
Figure 5:
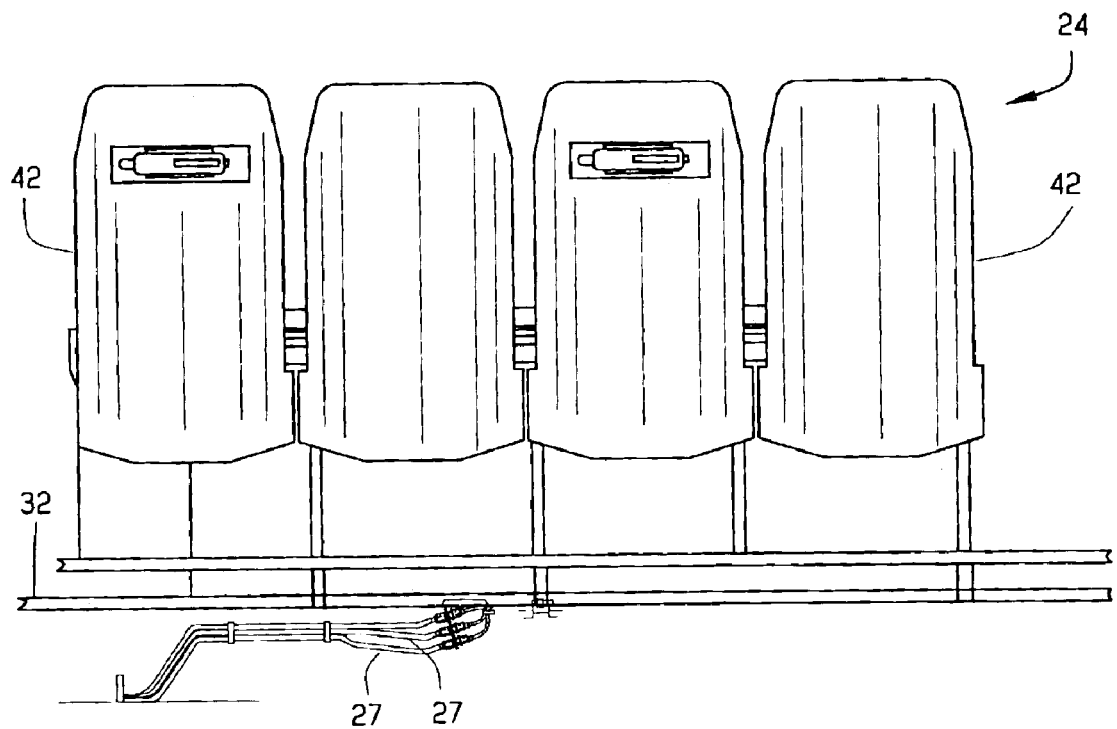
FIG. 5 is a back elevation view of a row of seats in the main cabin of a commercial aircraft showing cables below a floor panel of the main cabin.
Figure 6:
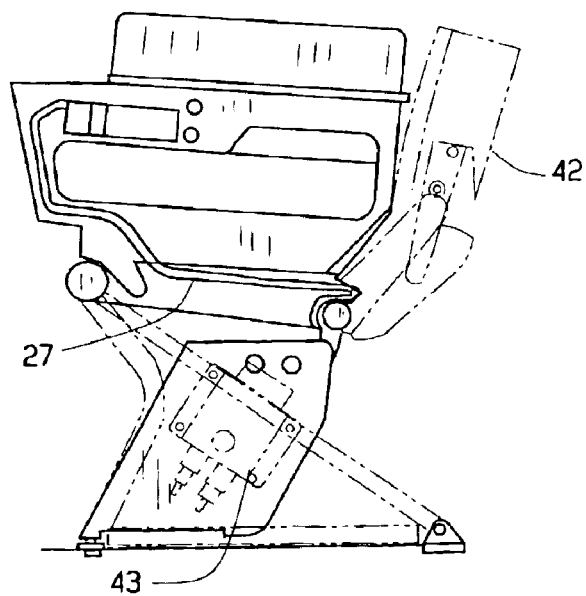
FIG. 6 is a side cross-sectional view of a seat in the main cabin of a commercial aircraft.

In order to provide communication with onboard systems, such as, for example, accessing onboard entertainment, cables 27, such as, for example, category 5 cables (as described in 1EEE 802.3) to support 100 base T star topology or extended star topology, are deployed throughout the main cabin 24 both above and below the main floor 32 (i.e., aircraft floor panel) of the aircraft 20 as shown in FIG. 5. The cabling may be used to support, for example, Ethernet utilized in deploying a LAN. These cables 27 may also support audio and video installed after the aircraft 20 is constructed and later modified. Further, cables 27 may be routed through and around the seats 42 as shown in FIG. 6. In connection with accessing and deploying the cables, the present invention provides access boxes 40 (i.e., cable access boxes) for use in accessing the cables for deployment throughout the main cabin 24. The cables are accessed through the access box 40, which allows passage of cables from under the main floor 32. Specifically, and as shown in FIG. 2, the access boxes 40 are installed directly into the main floor 32 of the aircraft 20 for use in accessing cables passing therethrough. The cables 27 may be provided to the access box 40, for example, when installed, or after aircraft construction is complete and during routine aircraft maintenance.

Figure 12:
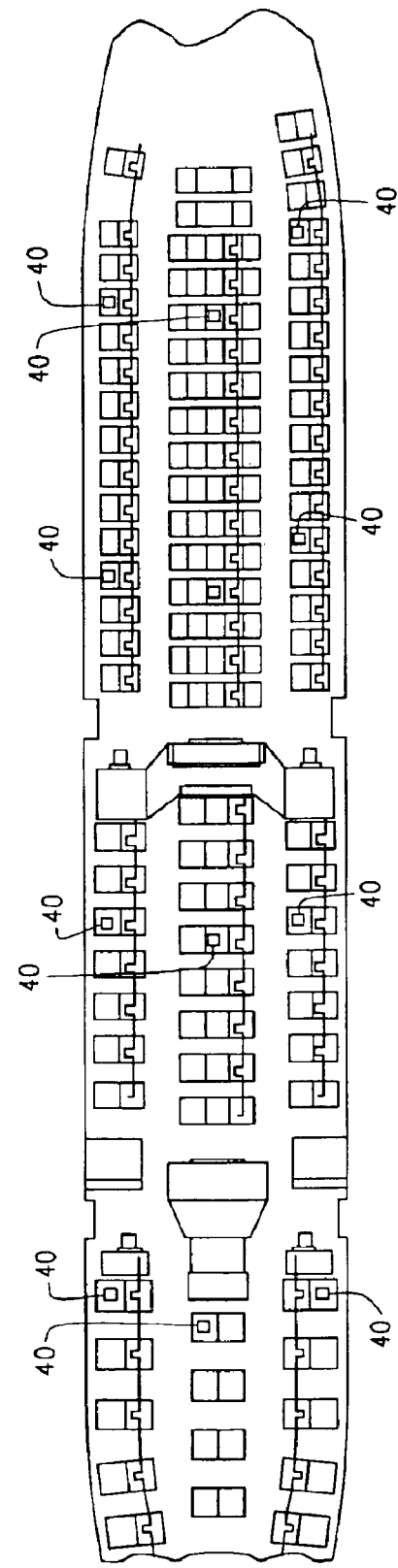
FIG. 12 is a plan view of a partial section of a main cabin of a commercial aircraft showing the improved access boxes installed therein.

It should be noted that depending upon the configuration of the aircraft, the access boxes 40 may be provided along the center of the main floor 32 or along the outboard seats of the main passenger cabin 24. For example, access boxes 40 may be installed in the first class seat section on either side of the fuselage 22 depending on system requirements, and on either side of the fuselage 22 in the tourist/economy class section. A predetermined spacing between installed access boxes 40 may be provided, for example, between a predetermined number of rows of seats 42 as shown in FIG. 12, such as 3 to 8 rows. Further, the access boxes 40 are preferably provided under a seat or seats 42 within the main passenger cabin 24 for connection to a communication box 43 thereunder as shown in FIG. 6.

It should be noted that the term cable as used herein refers to any type of link or connection, including for example, wires and communication lines to provide power, data, or other information.

Figure 3:
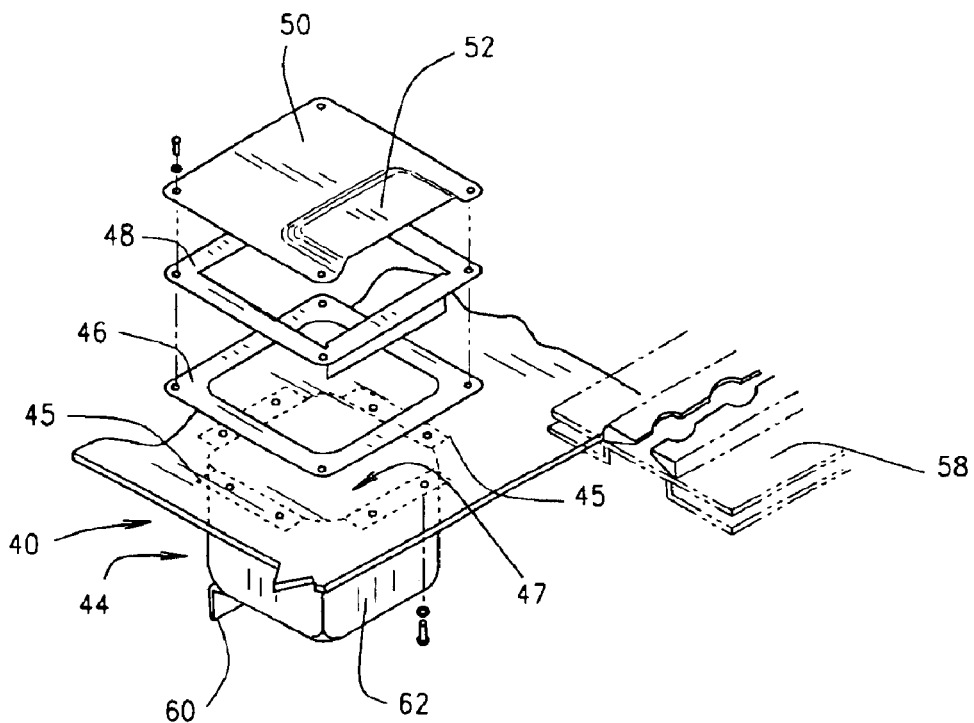
FIG. 3 is a top perspective view of an improved access box of the present invention.
Figure 7:
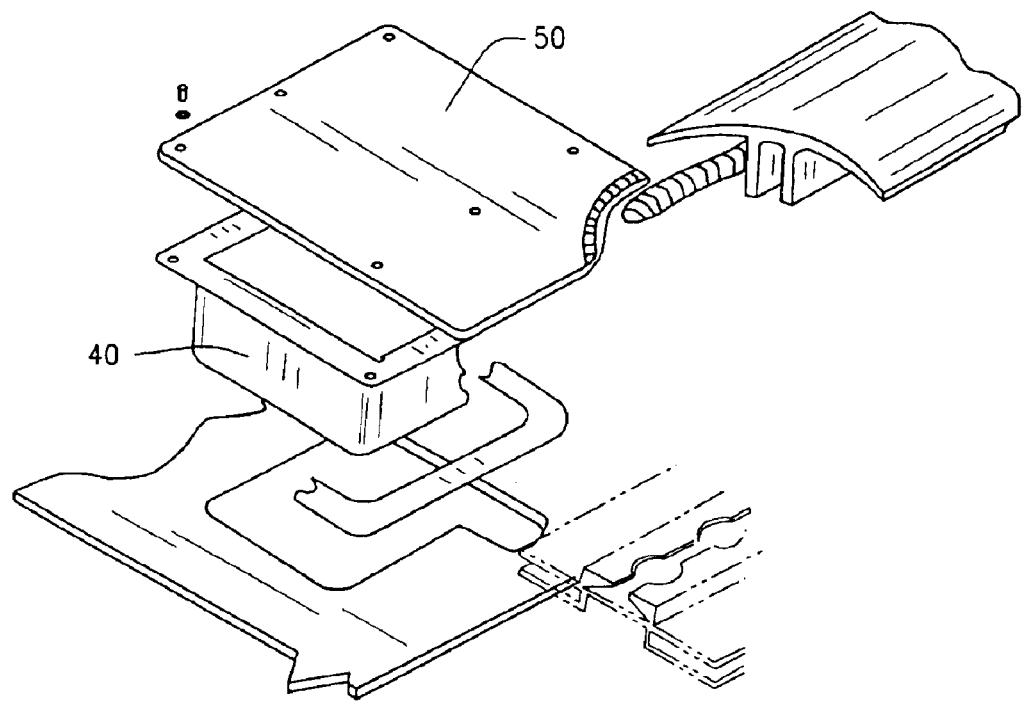
FIG. 7 is a top perspective view of an improved access box of the present invention having a flat cover.
Figure 8:
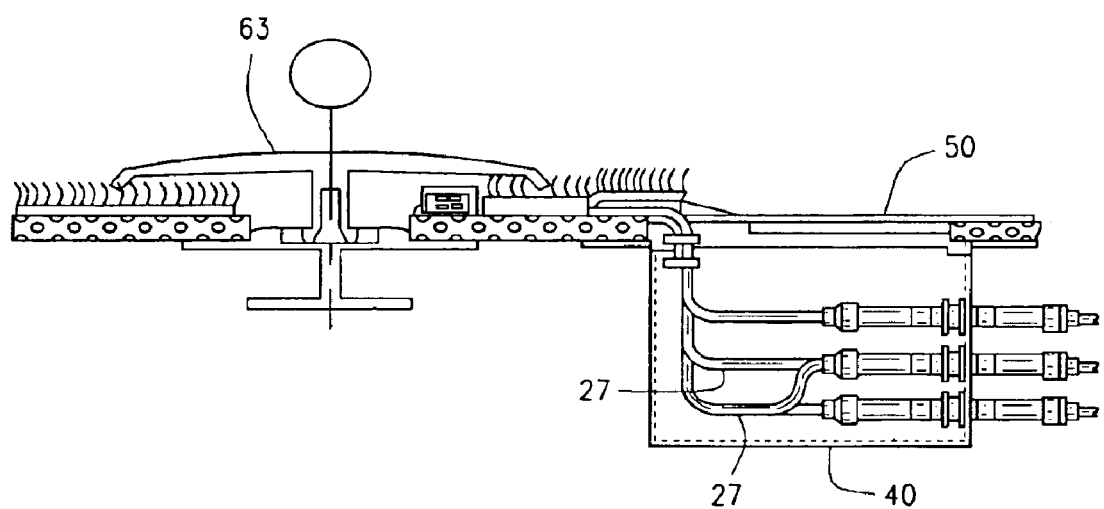
FIG. 8 is a side elevation view of an improved access box of the present invention having a flat cover.
Figure 9A:
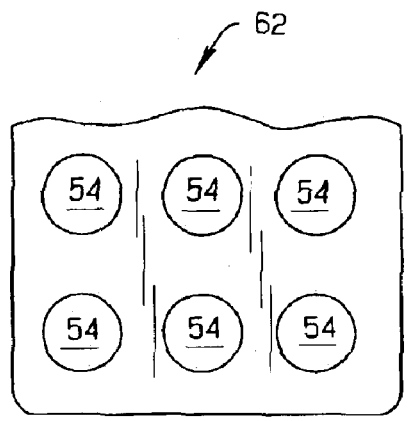
FIGS. 9(a)–(e) are side elevation views of different cutout configurations of the improved access box of the present invention.
Figure 9B:
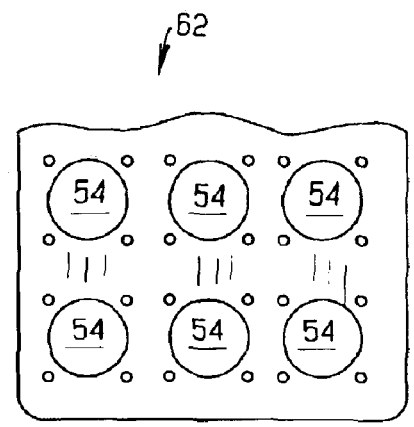
Figure 9C:
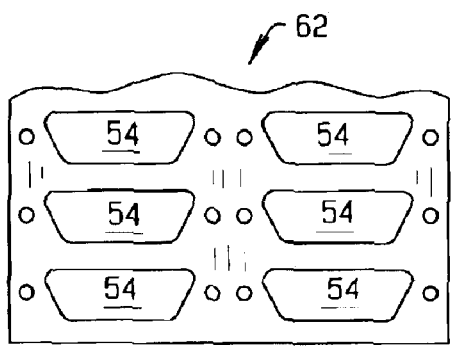
Figure 9D:
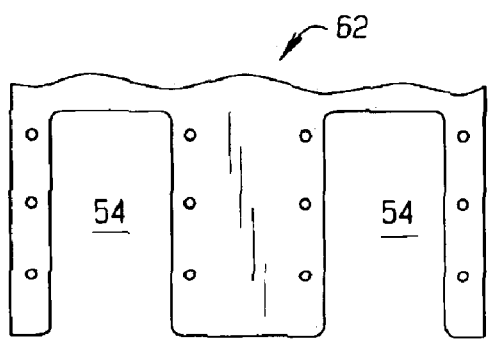
Figure 9E:
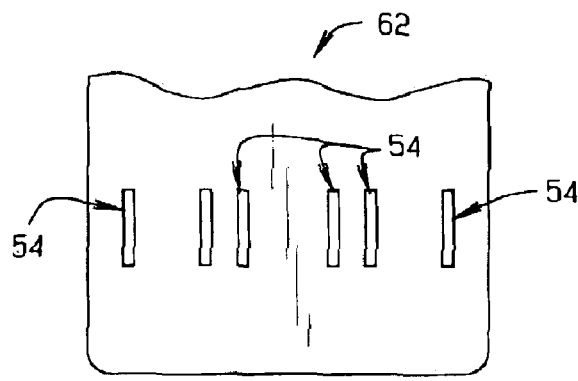

One preferred construction of an access box 40 is shown generally in FIG. 3. The access box 40 comprises a generally rectangular body 44 connected to the main floor 32 of the main cabin 26 using flanges 45. A top opening 47 (i.e., first opening) is provided for accessing cables therein. A rubber gasket 46 for providing sealing engagement of the rectangular body 44 to the main floor 32 is preferably provided. Further, a cable strain relief bracket 48 is provided to prevent stress on cables passing through the access box 40. A cover 50 for concealing cables within the access box 40 is also provided. As shown in the embodiment in FIG. 3, the cover 50 includes a raised portion 52 forming an opening allowing for the passage of cables therethrough for deployment throughout the main cabin 24. The cover 50 can include a variety of alternative openings, such as a recess in the cover 50 or even an aperature therethrough. In an alternate embodiment, the cover 50 is essentially flat and the cables are provided through the top side of the access box 40 as shown in FIGS. 7 and 8.

Figure 4:
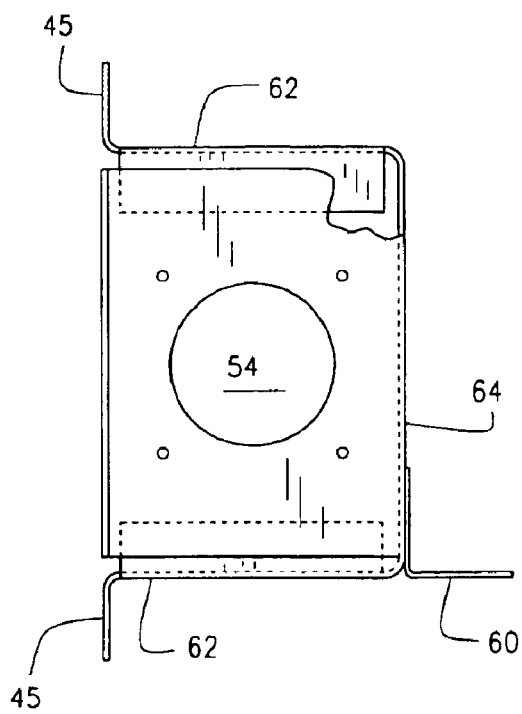
FIG. 4 is a side elevation view of an improved access box of the present invention.

As shown in FIG. 4, a side opening 54 (i.e., second opening) is provided to allow for the passage of cables from under the main floor 32 and up through the top opening 45 for deploying cables through the main cabin 24. It should be noted that different cutouts as shown in FIGS. 9(a)–9(e) may be provided as part of the side opening 54 to accommodate various cable termination configurations (i.e., different connectors for use in connecting cables). Further, a lower flange 60 may also be provided for further supporting mounting of the access box 40 to the main floor 32. The lower flange 60 may have cutouts used to deploy cable ties to secure the cables 27.

With respect to constructing the generally rectangular body 44, rivets may be provided to secure the various portions (i.e., sides 62, bottom 64 and flanges 45) of the generally rectangular body 44 and/or welding may be used to provide such construction. With respect to mounting the access box 40, and in particular the generally rectangular body 44, to the main floor 32, mounting holes (e.g., pre-drilled holes) within the main floor 32 having fasteners epoxied therein may be provided for use in connecting the generally rectangular body 44 using complimentary holes (e.g., predrilled holes) within the flanges 45. Further, mounting holes (e.g., predrilled holes) may be provided for connecting the gasket 46, cable strain relief bracket 48 and cover 50 to the main floor 32 as shown in FIG. 3.

Figure 11:
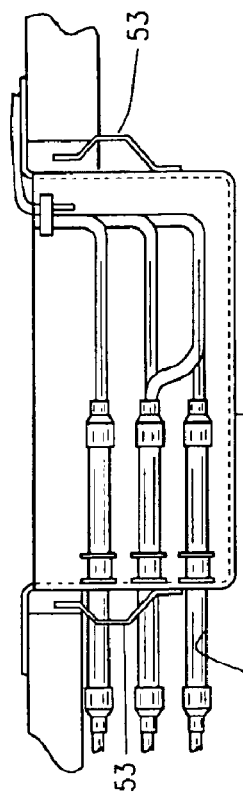
FIG. 11 is a side elevation view of the improved access box of the present invention having removable spring clips.
Figure 10:
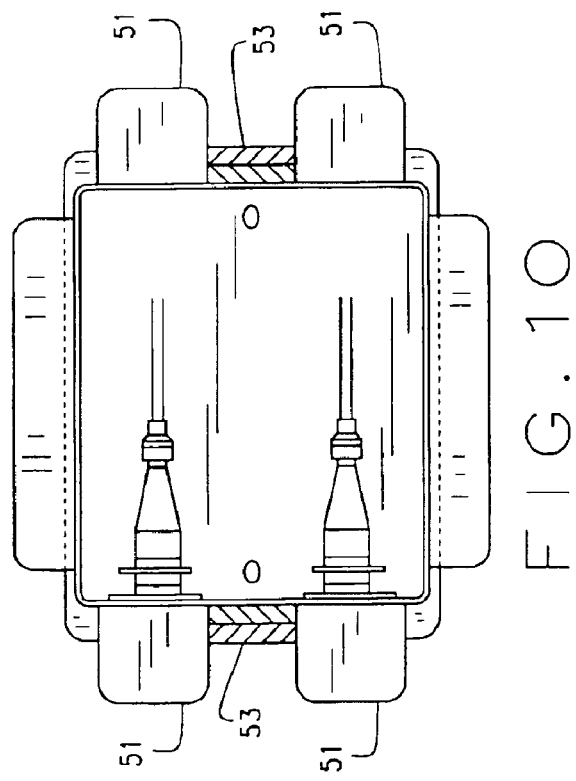
FIG. 10 is a top plan view of the improved access box of the present invention having removable spring clips.

More preferably, and as shown in FIGS. 10 and 11, to facilitate connection of the access box 40 to the main floor 32, clips 53, and in particular spring clips (e.g., steel spring clips) are used to removably secure the generally rectangular body 40 to the main floor 32. The spring clips 53 allow for installation of the access boxes 40 from the main passenger cabin 24 above the main floor 32. Further, holes for connection are not required in this embodiment for easy removal of the access box 40 if replacement or modification is necessary.

In the more preferred embodiment, the generally rectangular body 44 of the access box 40 is constructed with the following dimensions:

Width less than about 5 inches (127 mm);

Length less than about 7 inches (178 mm); and

Depth less than about 4 inches (102 mm).

With respect to installation of the access box 40, the following steps are preferably performed:

1. A hole is cut in the main floor 32 of the aircraft having dimensions slightly larger that the dimensions of the generally rectangular body 44. The access box 40 may be used as a template.
2. The hole is cleaned out for about an additional one-half inch (12.7 mm).
3. Quick drying (i.e. curing) adhesive is applied along the edge of the hole to seal the main floor 32 from humidity.
4. The generally rectangular body 44 is placed in the hole and the holes in flanges 45 are used as a template for drilling mounting holes in the main floor 32.
5. One-half inch (1.27 mm) diameter mounting holes are drilled in the main floor 32.
6. The generally rectangular body 44 is removed from the hole in main floor 32.
7. Appropriate fasteners, for example, locking potted inserts, are placed in the mounting holes and filled with epoxy.
8. The generally rectangular body 44 is connected to the main floor 32 using the fasteners.
9. The gasket 46, cable strain relief bracket 48 and box cover 50 are connected to the main floor 32 using the fasteners.

It should be noted that when using spring clips 53 as described herein for mounting, steps 4 to 8 are replaced with the following:

4a. Compressing the spring clips 53, for example, with a screwdriver.

5a. Mounting the cover 50 on tabs 51 as shown in FIG. 10.

6a. Mounting the compressed spring clips 53 between the tabs 51.

Once installed within the main cabin 24, the access boxes 40 provide passage of cables therethrough for deployment throughout the main cabin 24. Preferably, the access boxes 40 are mounted under seats 42 within the main cabin 24 close to a seat track 58 for deployment of cables therethrough under a conduit 63. This provides for concealing cables within the main cabin 24 that are above the main floor 32 and deployment to seats 42 therein. For example, cables deployed within the main cabin 24 may be connected to a communication box provided under each seat 42 for providing services in connection with onboard systems.

Thus, the present invention provides a plurality of access boxes 40 for use in the main cabin 24 of a commercial aircraft 20 to allow for easier deployment of cables therein. Further, use of smaller boxes positioned in specific locations within the main cabin 24 results in less severe structural modification to the commercial aircraft 20 and allows for more flexibility in design.

Although the application of the present invention as disclosed herein is generally directed to improved access boxes installed in specific locations in the main cabin of a specific aircraft, it is not so limited, and the present invention including the improved access boxes may be installed as required in different types of aircraft in different locations and having different dimensions. For example, the dimensions of the access boxes may be modified to accommodate installation under particular seats in a specific aircraft.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An access box for use in a support panel of a mobile platform comprising:
    a body having a first opening for accessing cables from within a main cabin and a second opening providing for passage of cables from behind the support panel of the main cabin;
    connection means for connecting the body to the support panel of the main cabin, said connection means generally located at an outer periphery of said first opening, said connection means including a spring clip providing removable connection of the body to the support panel from a location in the main cabin beyond the support panel; and
    a cover adapted for connection to the first opening to conceal the cables within the body, said cover having a first side and a second side generally opposite to one another, said first side located proximate said connection means for said body, said cover generally covering a substantial portion of said first opening, said cover having a cover opening separate from said first and second openings to allow passage of said cables from said access box to a location remote from said access box generally beyond the support panel.

2. The access box according to claim 1, wherein the body is connected to the support panel adjacent to a floor seat track for use in deploying cables throughout the main cabin using a channel of the floor seat track.

3. The access box according to claim 2, wherein the cover comprises a raised portion allowing for passage of cables from within the body to the channel of the floor seat track.

4. The access box according to claim 1, wherein a plurality of access boxes are provided within the main cabin at predetermined locations.

5. The access box according to claim 1, wherein the body is connected under a passenger seat.

6. The access box according to claim 1, further comprising a plurality of cutouts adapted to be removed to allow for passage of cables into the body.

7. The access box according to claim 6, wherein the cutouts are configured based upon a specific cable termination configuration.

8. An access box adapted for enclosing portions of a plurality of conductors adjacent a support panel in a mobile platform comprising:
    a body including at least one sidewall, a first portion having at least one opening therethrough adapted to allow passage of cables through said access box to a main cabin, a second portion and at least one additional opening through one of said sidewall and said second portion, said opening in said first portion and said additional opening each being adapted to allow passage of cables therethrough, said body including a first flange extending proximate said first portion of said access box, wherein said access box is adapted to be coupled to the support panel by a connection among the support panel, said first flange and a spring clip biasing said flange against the support panel, thereby providing removable connection of said body to said support panel from a location in the main cabin beyond the support panel;
    a cover adapted for connection to the support panel, said cover being generally flush with the support panel, said cover located proximate said first portion of said access box and concealing at least a portion of said opening in said first portion of said body portion, said cover having a cover opening separate from said opening in said first portion and said additional opening, said cover opening adapted to allow passage of said cables from said access box to a location above the support panel, said cover opening including a raised portion at an edge of said cover, thereby allowing cables to pass between said body and said raised portion of said cover.

9. The access box of claim 8, wherein said cover does not completely cover said opening in said first portion.

10. The access box of claim 8, wherein said first flange is located in the main cabin beyond said support panel.

11. The access box of claim 8, wherein said first flange is located behind said support panel.

12. The access box of claim 8, further comprising a rubber gasket disposed between said body and said cover, said gasket adapted to provide sealing engagement between said body and said cover.

13. The access box of claim 8, wherein said body has a second flange extending generally therefrom, said second flange being generally in the same plane as at least one of said sidewalls and adapted to further support mounting of said access box to said support panel.

14. The access box of claim 8, wherein said body includes a plurality of cutouts adapted to be removed, providing said additional opening.

15. The access box of claim 8, wherein said cover has a single opening adapted to allow passage of said cables from said access box to a location in the main cabin beyond the support panel.

16. The access box of claim 8, wherein said single opening is located proximate an end of said opening through said first portion.

17. In combination with a mobile platform having cables deployed within a main cabin of the mobile platform, an access box comprising:
    a generally rectangular body having a first opening for accessing cables within the rectangular body from the main cabin and a second opening providing for passage of cables from below a floor panel of the main cabin, the generally rectangular body having a width less than about five inches (127 mm) and a length of less than about seven inches (178 mm);
    connection means for connecting the rectangular body to the floor panel of the main cabin, said connection means comprising a spring clip providing removable connection of the generally rectangular body to the floor panel from above the floor panel; and
    a cover adapted for connection to the first opening to conceal the cables within the generally rectangular body.

* * * * *